June 20, 1944. P. D. FRIDAY 2,351,754
PACKING TRAY
Filed Aug. 1, 1941

INVENTOR
PAUL D. FRIDAY
BY Birkenbeuel
ATTORNEY

Patented June 20, 1944

2,351,754

UNITED STATES PATENT OFFICE 2,351,754

PACKING TRAY

Paul D. Friday, Portland, Oreg.

Application August 1, 1941, Serial No. 405,013

5 Claims. (Cl. 217—26.5)

This invention relates generally to the fruit industry and particularly to a packing tray and a method of packing fruit and other delicate or frangible objects such as glass ware, pottery, etc.

The main object of this invention is to construct an inexpensive, simple and efficient form of tray whereby a given size of fruit may be quickly and safely packed within a strong shipping box.

The second object is to practice a method of packing whereby the packing cost may be reduced to a minimum.

The third object is to construct a tray of papier-mâché or other suitable material, in such a form that the contact with the fruit is sufficient to sustain it in all directions without danger of the various pieces of fruit engaging each other at the same time, with a slight amount of material in each tray to provide the maximum amount of strength.

The fourth object is to produce a tray which will provide ample ventilation for the fruit and which will reduce handling to a minimum and permit the fruit to be displayed in attractive manners without building a special holder therefor.

These and other objects are accomplished in the manner set forth in the following specification as illustrated in the accompanying drawing, in which.

Similar numerals refer to similar parts throughout the several views.

Figure 1:
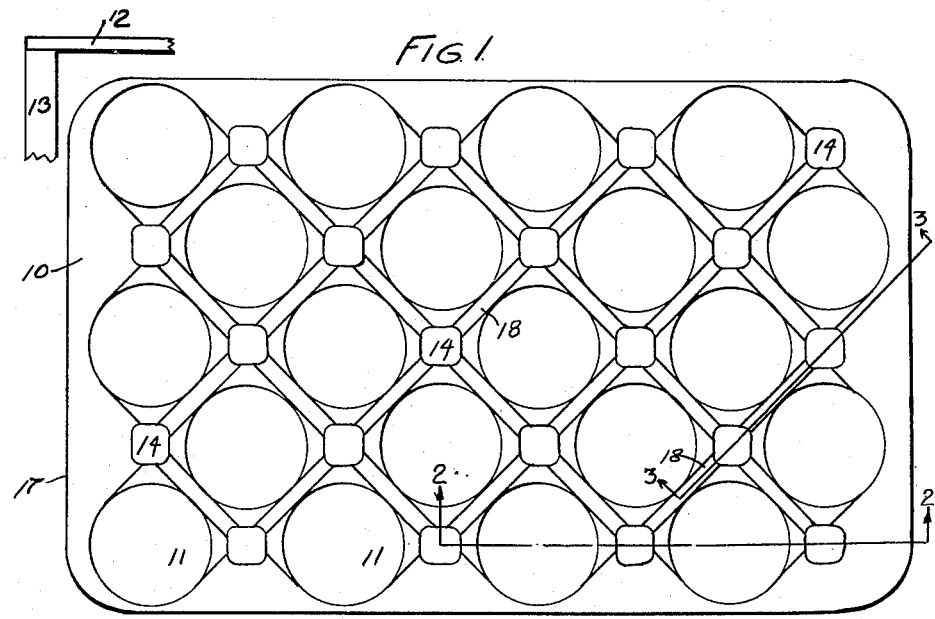
Fig. 1 is a plan of one of the trays.
Figure 2:
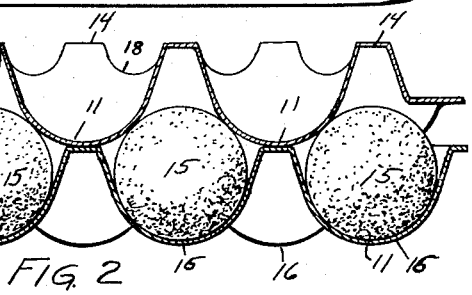
Fig. 2 is a front elevation of two of the trays showing parts thereof broken away in section along the line 2—2 in Fig. 1.
Figure 3:
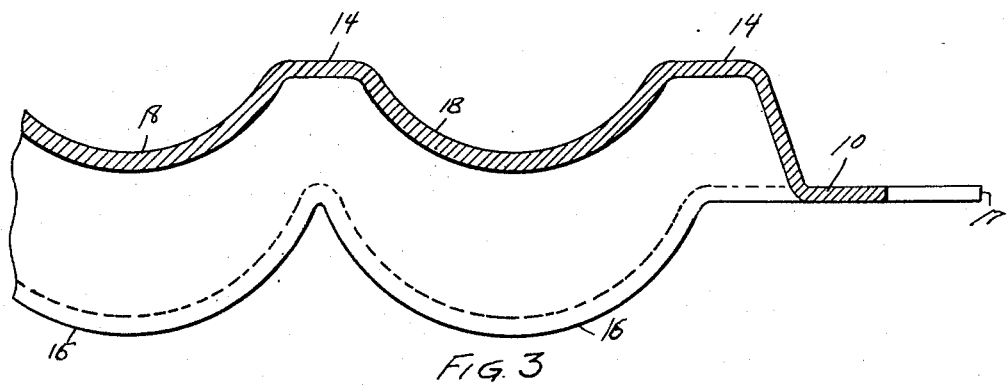
Fig. 3 is a fragmentary section of one of the trays taken along the line 3—3 in Fig. 1.

Referring in detail to the drawing, there is shown in Fig. 1 the plan of one tray 10 in which are formed along diagonal lines the pockets 11 between which, in directions normal to the box sides 12 and ends 13, are formed the elevated points 14 which are preferably flat on the top side thereof. The raised points 14 and the material supporting these points above the tray 10 will be referred to as posts.

The fruit 15, or other objects, is placed in the pockets 11 whose under side 16 rests upon the next lower point 14 thereby fixing the distance between the rim 17 which extends in a median plane between the points 14 and the under side 16 of the pocket 14. Saddle ridges 18 extend diagonally between the points 14.

It will be observed by an inspection of the drawing that the individual trays can be filled one at a time by unskilled laborers who merely have to place an empty tray upon the last filled tray and the weight of the superimposed tray is not borne by the fruit below it, but by the tray below, thereby overcoming one of the main difficulties in fruit packing today.

A further advantage arising from the use of these trays resides in the fact that paper cartons may be used more extensively for fruit handling since no reliance need be placed on the stiffness of the carrier for the holding of the package in a desired form.

Moreover, the fruit need not be placed in compression as is commonly the case when apples are packed under prevailing methods.

It will be noted that the number of pockets at one end of each tray equals the number and spacing as well as position of the posts at the opposite end of the same tray. Therefore, when the trays are superimposed in a manner that the ends having a like number of pockets are at the same end of a packing box, the trays will nest, but if alternate trays are turned 180 degrees then the posts of one tray will contact the under sides of the pockets in the next tray above.

Am of course aware that various forms of trays have been constructed in the past for holding materials in containers for storage or shipping; an example of such trays being the common form of egg carrier in which multiple dozens of eggs are packed in a case—the standard being thirty dozen, the dimension of the compartments accommodating the largest eggs.

With my method of packing and due to the peculiar formation of the trays, the outside dimension of the trays is approximately fixed, but the number of pockets in the trays will vary according to the size of the fruit or objects being packed.

I claim:

1. A pair of rectangular fruit trays, each of said trays having depending rounded pockets formed therein adjacent to each other in diagonal directions, and having hollow posts projecting upwardly therefrom between said pockets being in transverse alinement with said pockets permitting each rounded pocket to rest upon the top of the next post below when the two trays are turned 180° with relation to each other.

2. A packing tray consisting of a rectangular sheet having depending rounded pockets in diagonal alignment and separated by upright posts in directions normal to the sheet edges, the opposite ends of each tray having an unequal number of pockets.

3. A packing tray consisting of a rectangular sheet having depending rounded pockets in diagonal alignment and separated by upright posts in directions normal to the sheet edges and characterized by having a number of pockets in adjacent transverse rows in unequal number, the pocket bottom of one tray resting upon the posts of the next lower tray when turned 180 degrees with relation thereto.

4. A tray of the class described consisting of a flat rectangular sheet having hemispherical pockets formed therein extending below said sheet, said pockets being adjacent to each other along lines extending diagonally with respect to the side of the sheet and spaced from each other along lines normal to the sides of the sheet, an upright post extending above said sheet between each set of four pockets, the number of pockets in line extending normal from the sheet sides being unequal in adjacent rows, said trays nesting when the ends having the same number of pockets are superimposed and having the under side of the pockets in one tray resting on the posts of the next lower tray when the ends having unequal numbers of pockets are alternately superimposed.

5. The combination of a plurality of fruit packing trays having down-turned pockets and up-turned posts formed therein, any one of which trays forms a complete fruit support, the trays of each set being the same in design but having the number of pockets across one end equaling the number of posts in the row directly under same when the two trays are turned 180 degrees with relation to each other but having the number of pockets at one end of each tray equaling the number of posts across the other end of the same tray.

PAUL D. FRIDAY.